(12) United States Patent
Bahr et al.

(10) Patent No.: US 11,442,766 B1
(45) Date of Patent: Sep. 13, 2022

(54) SYSTEMS AND METHODS FOR OPEN THREAT HUNT

(71) Applicant: ARCHITECTURE TECHNOLOGY CORPORATION, Eden Prairie, MN (US)

(72) Inventors: Nathan Bahr, Eden Prairie, MN (US); Robert A. Joyce, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 403 days.

(21) Appl. No.: 16/780,547

(22) Filed: Feb. 3, 2020

(51) Int. Cl.
| | | |
|---|---|---|
| *G06F 15/16* | (2006.01) | |
| *G06F 9/455* | (2018.01) | |
| *H04L 9/40* | (2022.01) | |
| *G06F 9/50* | (2006.01) | |
| *H04L 67/568* | (2022.01) | |

(52) U.S. Cl.
CPC ........ *G06F 9/45558* (2013.01); *G06F 9/5077* (2013.01); *H04L 63/1441* (2013.01); *H04L 67/568* (2022.05); *G06F 2009/45587* (2013.01)

(58) Field of Classification Search
CPC .. G06F 9/5077; H04L 63/1441; H04L 67/568
See application file for complete search history.

(56) References Cited

U.S. PATENT DOCUMENTS

| | | | | |
|---|---|---|---|---|
| 8,943,489 | B1* | 1/2015 | Qu | G06F 8/656 717/172 |
| 9,398,028 | B1* | 7/2016 | Karandikar | H04L 63/1416 |
| 10,547,521 | B1* | 1/2020 | Roy | H04L 43/0876 |
| 11,080,041 | B1* | 8/2021 | Ah Kun | G06F 9/44505 |
| 2012/0259946 | A1* | 10/2012 | Stockhammer | H04N 21/8456 709/217 |
| 2014/0380415 | A1* | 12/2014 | Wang | H04L 43/04 726/1 |
| 2015/0222656 | A1* | 8/2015 | Haugsnes | G06F 21/552 726/23 |

(Continued)

OTHER PUBLICATIONS

Architecture Technology Corporation, Topic: AF191-065, Proposal No. F191-065-0416, Feb. 6, 2019, 19 pages.

*Primary Examiner* — Hieu T Hoang
(74) *Attorney, Agent, or Firm* — Foley & Lardner LLP

(57) ABSTRACT

Disclosed herein are embodiments of systems, methods, and products that provide adversary detection and threat hunting. A server may comprise a user side virtual machine facing the cyber protection users, a collection virtual machine facing the at-risk network, and a data repository. The server may receive user requests requesting status data from the at-risk network via the user side virtual machine. The server may collect status data from the at-risk network via the collection virtual machine and store the collected data into the data repository. Different users may request duplicate information from the at-risk network. The server may retrieve the requested information from the data repository for duplicate requests and return the responses immediately for such requests. Because the server does not query the at-risk network for duplicate requests, the server may reduce the amount of bandwidth needed to acquire and distribute the requested information.

20 Claims, 3 Drawing Sheets

(56) References Cited

U.S. PATENT DOCUMENTS

| | | | |
|---|---|---|---|
| 2016/0055026 A1* | 2/2016 | Fitzgerald | H04L 63/1433 |
| | | | 718/1 |
| 2016/0234108 A1* | 8/2016 | McAleer | G06F 9/455 |
| 2016/0366185 A1* | 12/2016 | Lee | G06F 9/45558 |
| 2017/0024240 A1* | 1/2017 | Black | G06F 3/0611 |
| 2018/0332069 A1* | 11/2018 | Moore | H04L 63/1433 |
| 2019/0392150 A1* | 12/2019 | Shevade | G06F 9/5072 |
| 2020/0374297 A1* | 11/2020 | Bilas | H04L 9/3271 |

\* cited by examiner

SYSTEMS AND METHODS FOR OPEN THREAT HUNT

TECHNICAL FIELD

This application relates generally to methods and systems for open threat hunting.

BACKGROUND

High value information technology (IT) assets, such as endpoints, servers, and devices within an at-risk network, face constant attack from adversaries. The impact of a significant compromise may be catastrophic. Adversaries may leverage component product and software defects to gain control of the at-risk network. The cyberattacks from adversaries may be any type of offensive maneuver that attempts to access data, functions or other restricted areas of the at-risk network without authorization, potentially with malicious intent.

As systems grow and are aggregated, assessment complexity grows exponentially due to potential interconnections and interdependencies, as well as more organizations involved in management and maintenance. For example, the at-risk network may comprise any number of distributed systems and network infrastructures and may comprise a plurality of subnets. Assessing the cybersecurity risks and their impacts for the at-risk network may be complex.

The existing and conventional methods for security assessment and threat hunting may involve a large number of cyber protection users that constantly monitor and request various status information from the at-risk network. Such constant requests in the conventional methods may generate a large amount of traffic in the at-risk network. However, the at-risk network may have limited resources and low bandwidth. As a result, when tasked with hunting adversaries on comparatively low-bandwidth at-risk networks, cyber protection teams (CPT) may require more throughput than the analyzed at-risk network can provide. While the different cyber protection users may need to collect status data and hunt open threats of the at-risk network, the low-bandwidth at-risk network may not be able to process the large number of requests and may cause severely slow speeds. Consequently, the security assessment and threat hunting of the at-risk network may be negatively affected.

SUMMARY

What is therefore desired is to have a system that provides adversary detection and hunting and supports multiple cyber protection users at once in a low bandwidth network. Embodiments disclosed herein describe a hypervised open threat hunter system that dramatically reduces bandwidth requirements. The hypervised open threat hunter may serve as an intermediary between existing cyber protection team hardware kits and the at-risk network by employing a shared intelligent data-collection front-end to gather information from the at-risk network and caching common analysis tools and threat models in a high-capacity virtualized backbone.

Specifically, a server may comprise a user side virtual machine facing the cyber protection users, a collection virtual machine facing the at-risk network, and a data repository. The user side virtual machine may be a protected virtual machine that is separated from the collection virtual machine. Users may access data from the user side virtual machine and the repository, while the separate collection virtual machine acts as the direct interface to the at-risk network. The server may receive user requests requesting status data of the at-risk network via the user side virtual machine.

The server may collect status data from the at-risk network via the collection virtual machine and store the collected data into the data repository. Because different users may request duplicate information for the at-risk network, the server may retrieve the requested information from the data repository for duplicate requests and return the responses immediately for such requests. Because the server does not query the at-risk network for duplicate requests, the server may reduce the amount of bandwidth needed to acquire and distribute the requested information.

As the number of cyber protection users increases, and presumably the data that each user needs is redundant, advantages of the embodiments disclosed herein may increase. Specifically, the time it takes a user to access the state of the at-risk network, determine the presence of threats and adversaries, and take actions against them decreases because of fast access to cached data and reduced load on the at-risk network.

In one embodiment, a computer-implemented method comprises receiving, by a server from a first electronic user device, a first request requesting a first status data of an at-risk network via a first virtual machine of the server; collecting, by the server, the first status data from the at-risk network via a second virtual machine of the server that is isolated from the first virtual machine of the server; transmitting, by the server, the collected first status data to the first electronic user device via the first virtual machine of the server; caching, by the server, the collected first status data into a data repository of the server; receiving, by the server from a second electronic user device, a second request requesting a second status data of the at-risk network via the first virtual machine of the server; upon the second status data corresponding to the first status data, retrieving, by the server, the first status data from the data repository instead of the at-risk network; and transmitting, by the server, the retrieved first status data to the second electronic user device via the first virtual machine of the server.

In another embodiment, a computer system comprises a first electronic user device, a second electronic user device, a server in communication with the first and second electronic user devices and configured to: receive, from the first electronic user device, a first request requesting a first status data of an at-risk network via a first virtual machine of the server; collect the first status data from the at-risk network via a second virtual machine of the server that is isolated from the first virtual machine of the server; transmit the collected first status data to the first electronic user device via the first virtual machine of the server; cache the collected first status data into a data repository of the server; receive, from the second electronic user device, a second request requesting a second status data of the at-risk network via the first virtual machine of the server; upon the second status data corresponding to the first status data, retrieve the first status data from the data repository instead of the at-risk network; and transmit the retrieved first status data to the second electronic user device via the first virtual machine of the server.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1A:
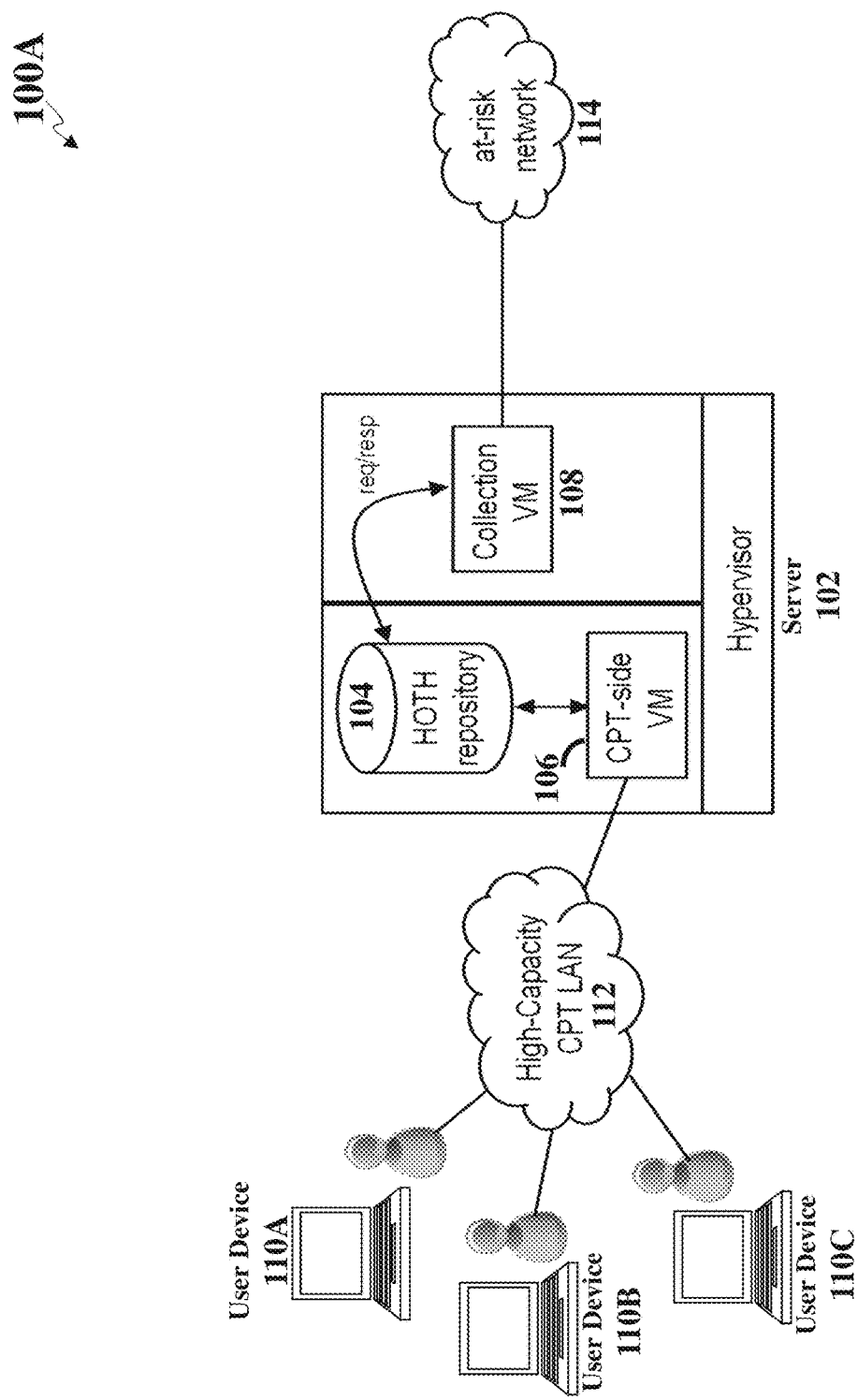
FIG. 1A illustrates a computer system for hypervised open threat hunter, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide an adversary detection and hunting system capable of supporting multiple cyber protection users at once in a low bandwidth network. The system combines hypervised virtual machines, an efficient data repository, and secure inter-domain communication. The hypervised virtual machines may include the user side virtual machine and the collection virtual machine running on a hypervisor (e.g., the server).

The embodiments disclosed herein may leverage virtual machine technology to realize network efficiency and security. The system may enforce a separation boundary, or partition, between the user side virtual machine and the collection virtual machine. With this hypervised partition, the system may need a way to move the relevant data for network sensing and caching to the user side. The system may comprise an inter-domain communication channel over which the virtual machines may exchange data with each other. The inter-domain communication channel may be robust enough to both protect the cyber protection kits associated with the users from infection and prevent unnecessary or duplicate traffic from the user side from taking up bandwidth on the at-risk network side.

The efficient data repository may be a single data repository that is capable of caching network-level data in a way that is useful for cyber protection analytical tools. The system may remove duplicate or near-duplicate information flowing from the at-risk network to the cyber protection users. For example, in a given type of cyber protection mission, the commands requesting the heaviest traffic flows and the most used applications might be called frequently and by different users. The embodiments disclosed herein may recognize the duplicate requests and allow the access to the data repository without issuing multiple packets with the same essential information on the at-risk network. The use of this cached information in the data repository may free up bandwidth and resources on the at-risk network, while still providing the required information to the cyber protection users.

Cyber protection users may access data repository through the user side virtual machine. The data collection on the at-risk network may be through the collection virtual machine. The two virtual machine may be isolated from each other. All data flowing in both directions between the user devices and the at-risk network may pass through the server and the network-efficient repository, guaranteeing the controlling of exactly how much bandwidth to use.

FIG. 1A illustrates components of a hypervised open threat hunter system 100A, according to an embodiment. The system 100A may include a server 102 connected with a set of electronic user devices 110A, 110B, 110C (collectively referred to as 110) via hardware and software of a high-capacity network 112. The server 102 may also connect to an at-risk network 114. The high-capacity network 112 may support high speed network communication and have the capacity to process large amount of network traffic. Examples of the high-capacity network 112 include, but are not limited to, Local Area Network (LAN), Wireless Local Area Network (WLAN), Metropolitan Area Network (MAN), Wide Area Network (WAN), and the Internet. The communication over the network 112 may be performed in accordance with various communication protocols, such as Transmission Control Protocol and Internet Protocol (TCP/IP), User Datagram Protocol (UDP), and IEEE communication protocols.

The server 102 may be any computing device comprising a processor and other computing hardware and software components. The server 102 may be logically and physically organized within the same or different devices or structures, and may be distributed across any number of physical structures and locations (e.g., cabinets, rooms, buildings, cities).

The server 102 may be a computing device comprising a processing unit. The processing unit may include a processor with computer-readable medium, such as a random access memory coupled to the processor. The server 102 may be running algorithms or computer executable program instructions, which may be executed by a single processor or multiple processors in a distributed configuration. The server 102 may be configured to interact with one or more software modules of a same or a different type operating within the system 100A.

Non-limiting examples of the processor may include a microprocessor, an application specific integrated circuit, and a field programmable object array, among others. Non-limiting examples of the server 102 may include a server computer, a workstation computer, a tablet device, and a mobile device (e.g., smartphone). Some embodiments may include multiple computing devices functioning as the server 102. Some other embodiments may include a single computing device capable of performing the various tasks described herein.

In some embodiments, the server 102 may be a device with specific resource limits to ensure viability in low-SWaP (size, weight, and power), low-bandwidth use case common to cyber protection missions. For example, the server may be a motherboard ensuring a design with dimensions 12"×6"×12" and a weight under 30 pounds, capable of being transported by a single person as a carry-on item. This form factor may also allow for tens of terabytes of storage along with a processor that is powerful enough to execute the process described herein. The server 102 may be compatible with existing user device kits.

For example, the server 102 may comprise an Intel processor in the 3-4 GHz range, with 8-16 TB of storage and 32-64 GB of memory, gigabit network connections, along with a GPU (graphic processing unit) for running the user programs or other more intensive network sensing and analytics algorithms. The system may use a development platform (e.g., OpenXT, Xen, Hyper-V, and the like) for security and virtualization to ensure the system disclosed herein is hardened against adversarial threats present in any at-risk network 114 it may connect to. The server 102 may comprise any other configurations. The open threat hunter system disclosed herein may run on a variety of platforms.

The electronic user device 110 may be any computing device allowing a user to interact with the server 102. The electronic user device 110 may be any computing device comprising a processor and non-transitory machine-readable storage medium. The examples of the computing device may include, but are not limited to, a personal digital assistant (PDA), a smartphone, a tablet computer, and the like. The electronic user device 110 may be a mobile device or handheld computer that provide a touchscreen interface with digital buttons and keyboard or physical buttons along with a physical keyboard. The electronic user device 110 may comprise integrated cameras, digital media players, and the global positional system (GPS) capabilities. The electronic user device 110 may comprise any number of input and output devices supporting various types of data, such as text, image, audio, video, and the like.

The at-risk network 114 may be any network comprising distributed systems and network infrastructures. The at-risk network 114 may comprise a plurality of subnets. The at-risk network 114 may be the target of cyberattacks from one or more adversaries. The cyberattacks from adversaries may be any type of offensive maneuver that attempts to access data, functions or other restricted areas of the at-risk network 114 without authorization, potentially with malicious intent. The adversaries may steal, alter, and/or destroy one or more network devices within the at-risk network 114. The cyberattacks may range from installing spyware on a particular computer to attempting to destroy the infrastructure of entire system of the at-risk network 114.

The at-risk network 114 may have limited resources and low bandwidth. While the different cyber protection users may need to collect status data and hunt open threats of the at-risk network 114, the low-bandwidth at-risk network 114 may not be able to process the large number of requests and may cause severely slow speeds.

The server 102 may be between the cyber protection user devices 110 and the at-risk network 114, and provide the users a high-bandwidth enclave for their mission even if the at-risk network 114 is much slower. The server 102 may decrease bandwidth consumption on the at-risk network 114, which in turn may increase the efficiency of the threat hunting.

The server 102 may receive one or more requests from the electronic user devices 110 associated with the cyber protection users. The requests may request status information of the at-risk network 114. For example, a first cyber protection user may request to scan a host computer of the at-risk network 114 for open ports. The server 102 may intercept the IP (Internet protocol) packet of the request. Furthermore, the server 102 may collect the requested data from the at-risk network 114. For example, the server 102 may make a record of the packet, forward the packet to the at-risk network 114 and wait for a response. Upon receiving/collecting the requested data from the at-risk network 114, the server 102 may store the initial request and the collected data (e.g. response) to the data repository 104. The server 102 may also transmit the response comprising the collected date to the user device associated with the first cyber protection user.

At a later time, a second cyber protection user may request to initiate a scan of the same host computer. The server 102 may intercept the packet of the request and determine that the request of the second user requests the same information as the first user. The server 102 may immediately return a copy of the response returned to the first user. Certain types of the information requested, such as which ports are open on the target host computer, may not change rapidly. As a result, the server 102 may use the same information for different user requests. The embodiments disclosed herein may allow different users to obtain relevant data from the at-risk network 114 while reducing the amount of bandwidth needed to acquire and distribute the data.

The server 102 may comprise a network-efficient data repository 104, a user side virtual machine (VM) 106 and a collection virtual machine 108. The server 102 may be a hypervisor that performs the hypervised open threat hunting using the virtual machines 106, 108 running on it. The server (e.g., hypervisor) 102 may perform data collection on the at-risk network 114 through the collection virtual machine 108 that interfaces the at-risk network 114. The collection virtual machine 108 may identify the duplicate requests from multiple users. Further, the collection virtual machine 108 may ensure that the requests generated by the users do not overrun the at-risk network 114. The majority of the relevant data requested by the users may be application layer data, such as NetFlow information, or data specific to a network-connected machine, such as usernames or process information. Such requested data may ensure that the server 102 is able to aggregate data from network infrastructure and network-connected devices.

The data repository 104 may comprise one or more databases to store the requests and the responses (e.g., collected data on the at-risk network) of different users. The data repository 104 may be any non-transitory machine-readable media configured to store the requests and the responses. The data repository 104 may be part of the server 102. The data repository 104 may be a separate component in communication with the server 102. The data repository 104 may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions.

When a user requests a piece of information that another user or application has recently requested, the server 102 may return the requested data from the data repository 104 without retrieving the data from the at-risk network 114 (e.g., forwarding the requests to the at-risk network). As a result, many cyber protection users and/or hardware kits can effectively share the data they need from the at-risk network 114 without constantly retrieving the data from the at-risk network 114, tying up resources and using more bandwidth on the at-risk network 114. The data repository 104 may include a common interface for all cyber protection users or applications to interact with, so as to view and analyze the sum total of the collected data.

The server 102 may use a filter mechanism to determine which requests to be forwarded to the at-risk network 114 and which responses from the at-risk network are allowed back to the user side virtual machine. The filter mechanism may ensure that an adversary residing on the at-risk network 114 cannot access the user device resources.

The server (e.g., hypervisor) 102 may leverage virtual machine technology to realize network efficiency and security. The server 102 may enforce a separation boundary (e.g., partition) between the user side virtual machine 106 and the collection virtual machine 108 to isolate the two virtual machines from each other. With this hypervised partition, the server (e.g., hypervisor) 102 may also need a way to move the relevant data for networking sensing and caching from the at-risk network side to the user side. The server may use an inter-domain communication channel to exchange data between the virtual machines. All data flowing in both directions between the cyber protection user devices 110 and the at-risk network 114 may pass through the server 102, guaranteeing the possibility of controlling exactly how much bandwidth the system can use.

The cyber protection user devices 110 may use different kits with diverse applications for network assessment, host forensics, and defense mechanisms. Many of these applications may rely on the same set of data about the at-risk network 114. In other words, all users may need basic information about the at-risk network 114. The server 102 may decide which requested information is the most important and cache such information in the data repository 104 for access by users without increasing the load on the low-bandwidth at-risk network 114. As a result, the users may require fewer at-risk network resources, and all users may acquire essential data faster, decreasing the time adversary hunting could potentially take. Furthermore, the data repository 104 may replay collected data as part of post-mortem analysis.

Figure 1B:
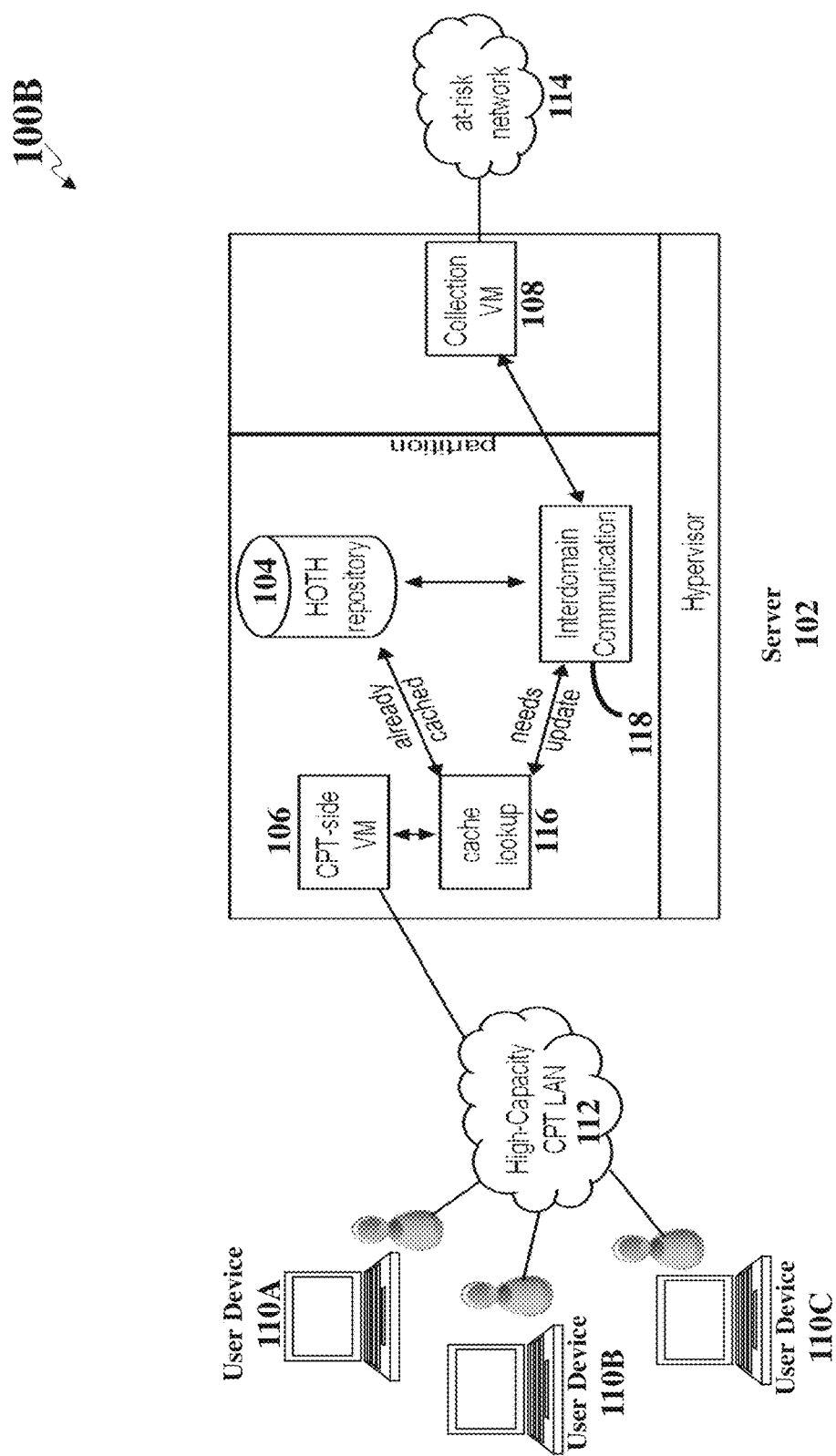
FIG. 1B illustrates data flow of the hypervised open threat hunter system, according to an embodiment.

FIG. 1B illustrates data flow of the hypervised open threat hunter system, according to an embodiment. Initially, the server 102 may receive a first request from a first electronic user device 110A via the user side virtual machine 106. The first request may request status data and/or any other information regarding the at-risk network 114. The server 102 may collect the requested data from the at-risk network 114 through the collection virtual machine 108. The user side virtual machine 106 and the collection virtual machine 108 are isolated from each other. The communication between the user side virtual machine 106 and the collection virtual machine 108 may be through the inter-domain communication channel 118.

After the server 102 receives the requested data through the inter-domain communication channel 118, the server 102 may store the request and the collected data corresponding to the request into the data repository 104. The server 102 may return the response comprising the collected data to the first electronic user device 110A through the user side virtual machine 106. The server 102 may communicate with the user device 110A over the high-capacity network 112.

For the purpose of security, the server 102 may be partitioned into two isolated areas. The first area may be the user side area that comprises the user side virtual machine 106 and the data repository 104. The data repository 104 may store all data in a structured database for cyber protection user applications to hunt for adversaries and threats. The second area may be the at-risk network side area that comprises the collection virtual machine 108. The collection virtual machine 108 may comprise required applications to access the state and traffic of the at-risk network 114. The communication between these two areas may be through the inter-domain communication channel 118. Upon the user side virtual machine 106 receiving the request, the server 102 may transport the request from the user side area to the at-risk network side area over the inter-domain communication channel 118, specifically, from the user side virtual machine 106 to the collection virtual machine 108. Upon the collection virtual machine 108 receiving/collecting the requested data regarding the at-risk network, the server 102 may transport the collected data from the at-risk network side area (e.g., collection virtual machine) over the inter-domain communication channel 118 into the user side area that includes the user side virtual machine 106 and the data repository 104. The server 102 may further store the collected data to the data repository 104.

The partition may assure both that an adversary cannot infiltrate the threat hunter system, and that the threat hunter system will not increase the strain on the low bandwidth network. The inter-domain communication channel 118 may move relevant data across this partition. For example, the embodiments disclosed herein may use a method named V4V (virtual machine for virtual machine) to move network data into the efficient repository to allow cyber protection users to access the data. In addition to being secure, having V4V broker all communications with the at-risk network may allow the server to manage all potential traffic to the at-risk network. The inter-domain communication channel 118 may allow the server to measure and limit the amount of traffic generated so as to not adversely affect a low bandwidth network (e.g., the at-risk network 114). This also means that the server 102 may be aware of the effect certain commands will have on the at-risk network 114.

At a later time, the server 102 may receive a second request from a second electronic user device 110B via the user side virtual machine 106. The second request may request status data and/or any other information regarding the at-risk network 114. The server 102 may perform cache lookup 116 and determine whether the requested data is stored in the data repository 104. If the requested data is already cached within the data repository 104, the server 102 may retrieve the requested data from the data repository 104 and return the response (e.g., comprising the requested data) immediately to the second electronic user device 110B through the user side virtual machine 106. The server 102 may communicate with the second electronic user device 110B over the high-capacity network 112. If the requested data is not cached within the data repository 104, the server 102 may determine that the data repository 104 needs update. The server 102 may utilize the inter-domain communication channel 118 to forward the request to the at-risk network 114 through the collection virtual machine 108. The server 102 may collect the requested data from the at-risk network 114 as discussed above. The server may store the newly collected data into the data repository 104.

The data repository 104 may be the centralized cache of all network data requested by the cyber protection users via user applications, any analysis tools, and threat models that the users use. The data repository 104 may exist as a virtual machine to which the server controls data access. Specifically, only the cache-lookup 116 and inter-domain communication channels 118, which are implemented as their own virtual machines, are allowed to access the data repository 104.

In the likely scenario of multiple users accessing the same data, duplicate requests from the at-risk network are eliminated; responses to data are faster on average; the at-risk network's utilization is not overrun by the users; and the server provides an additional layer of the security between the users and adversaries.

The embodiments disclosed herein may allow the system to use physical resources and processor time efficiently and let multiple users take advantage of the same set of hardware and software without increasing the overall footprint of the system. The single data repository 104 stores all data collected from the at-risk network 114 to efficiently move relevant information out of the low-bandwidth at-risk network 114 into the high bandwidth enclave the cyber protection users equipped with. The inter-domain communication channel 118 may enable the movement of data across the partition in the server 102, ensuring quick movement of data while minimizing the possibility of infecting more devices.

Figure 2:
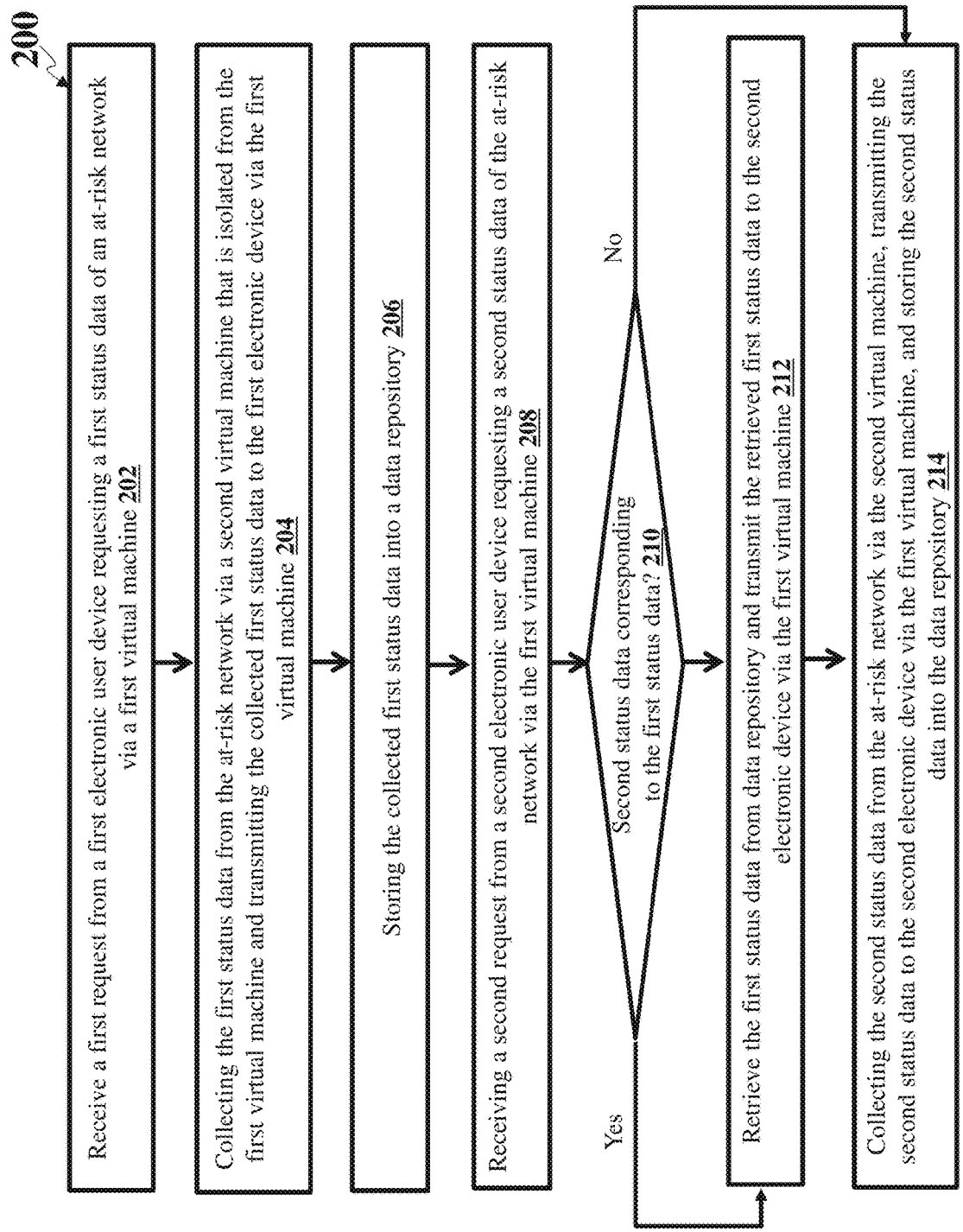
FIG. 2 illustrates a flowchart for the hypervised open threat hunting, according to an embodiment.

FIG. 2 illustrates a flowchart for the hypervised open threat hunting, according to an embodiment. Other embodiments may comprise additional or alternative steps, or may omit some steps altogether.

At step 202, the server may receive a first request from a first electronic user device requesting a first status data of the at-risk network. The server may receive the first request through the user side virtual machine (e.g., a first virtual machine) of the server. The user side virtual machine may interface the user devices over a high-capacity network. The first electronic user device may be associated with a first cyber protection user. The first request may request status data and/or any other information regarding the at-risk network. For example, a first cyber protection user may request to scan a host computer of the at-risk network for open ports. The server may intercept the IP (Internet protocol) packet of the first request. The server may also make a record of the first request by storing the IP packet into a data repository of the server.

The at-risk network may have limited resources and low bandwidth. While different cyber protection users may need to collect status data and hunt open threats of the at-risk network, the low-bandwidth at-risk network may not be able to process the large number of requests and may cause severely slow speeds.

As discussed above, for security purpose, the server may be partitioned into two isolated areas. The first area may be the user side area that comprises the user side virtual machine and the data repository. The second area may be the at-risk network side area that comprises the collection virtual machine. The communication between these two areas may be through the inter-domain communication channel. Upon the user side virtual machine receiving the request, the server may transport the request from the user side area to the at-risk network side area over the inter-domain communication channel, specifically, from the user side virtual machine to the collection virtual machine. In other words, the server may utilize the inter-domain communication channel to forward the request from the user side virtual machine to the collection virtual machine.

The secure hypervisor architecture disclosed herein may be resistant to detection and compromise by the attackers. Even if an adversary gains access to the network-facing side of the server (e.g., the collection virtual machine), the adversary would not have access to the user side due to the partition. The system and method disclosed herein may provide an additional assurance of security with the use of the virtual machine for virtual machine (V4V) framework for inter-domain communications. The framework does not let the virtual machines share any memory, keeping the user side and the at-risk network side of the hypervised partition separate. All communication between the user side and the at-risk network side flows though one channel managed by the server to improve the security. Further, the server may be able to check all traffic to see if the cache could be used instead of using the network resources of the at-risk network.

At step 204, the server may collect the requested data (e.g., first status data) from the at-risk network. The server may collect the requested data through the collection virtual machine (e.g., a second virtual machine) of the server. The collection virtual machine may interface the at-risk network and collect the requested data from the at-risk network. Upon the collection virtual machine receiving/collecting the requested data regarding the at-risk network, the server may transport the collected data from the collection virtual machine over the inter-domain communication channel into the user side area that includes the user side virtual machine and the data repository. The server may further store the collected data to the data repository.

The collection virtual machine may be able to query the state of the machines and networks within the at-risk network. The collection virtual machine may be able to collect Netflow and other application layer protocol traffic, as well as information about the routers and other devices included in the at-risk network.

The server may also transmit the response comprising the collected date to the first electronic user device associated with the first cyber protection user. The server may return the response comprising the collected data to the first electronic user device through the user side virtual machine. The server may communicate with the user device over the high-capacity network.

At step 206, the server may store the collected data (e.g., first status data) into the data repository. The server may store the collected data, the timestamp of the data collection, the type of the collected data, and any other related information of the collected data into the data repository.

The at-risk network may comprise multiple smaller subnets. Each of these subnets may generate data individually, which may require large storage. A "collect it all" approach may be unrealistic especially when the server is an equipment with SWaP (size, weight, and power) constraints. For the system to be agnostic to the variety of tools users employ over the course of their mission, the server may make decisions about what to cache by analyzing application-layer data exchanged over the at-risk network. The system may employ a caching technique, where recently accessed data is stored. If a user requests data that was recently cached, a local copy of the data will be served to the user instead of accessing the at-risk network again. Examples of relevant information may include which network connections relay the most traffic (e.g., information that may be captured by Netflow-enabled devices) or an anomalous event detected in a specific host (e.g., information that could be contained in operating system specific log files). The server may monitor the user requests for the broad range of information and record both the users' requests and subsequent data collected from the at-risk network.

In terms of passively gathered data, such as the data captured by a promiscuous-mode protocol analyzer running on the collection virtual machine's at-risk network interface, the server may categorize the gathered data by the time it was collected. Cyber protection users may request historical packet capture data from the system disclosed herein.

In some embodiments, the server may determine when cached data is stale, and when to request an update through the inter-domain channel. The server may update status data in the data repository based on a last-update timestamp and a type of the status data. In some embodiments, the server may use a combination of the last update and the type of information requested by the users. Some types of requests may be for information that is more fixed in the state of the at-risk network, such as a host's IP address. Such information may be cached and infrequently updated. Other information may change more frequently, such as which applications are the most active on the at-risk network. Such information may still be cached, but may be updated more frequently to better reflect the state of the at-risk network.

The embodiments disclosed herein may use an emulated test network to recognize how often relevant information needs to be updated. Network sensing and analytics requests may be made, while a control network monitors what data is actually returned, and which types of requests use the most bandwidth. This may also reveal which types of relevant network information change frequently and which types are static. The test network may comprise dozens of nodes representing various infrastructure components that are connected. The testing may aggregate data both on what is worth caching and how often that cache should be updated. Based on such data, the system disclosed herein may determine the best policy for caching network analysis data, which is central to the development of the network-efficient data repository.

At step 208, the server may receive a second request from a second electronic device requesting a second status data of the at-risk network. The server may receive the second request through the user side virtual machine (e.g., a first virtual machine) of the server. The user side virtual machine may interface the user devices over a high-capacity network. The second electronic user device may be associated with a second cyber protection user. The second request may request status data and/or any other information regarding the at-risk network. The server may intercept the IP (Internet protocol) packet of the second request. The server may also make a record of the second request by storing the IP packet into the data repository of the server.

At step 210, the server may determine whether the second status data is corresponding to the first status data. In other words, the server may determine whether the requested data (e.g., second status data) is already included in the data repository. In one embodiment, the server may determine that the requested data is included in the data repository when the requested second status data is identical to the first status data that is stored within the data repository. In an alternative embodiment, the server may determine that the requested data is included in the data repository when the requested second status data can be derived from the first status data that is stored within the data repository. If the data is already cached/included in the data repository, the process may proceed to step 212; otherwise, the process may proceed to step 214.

At step 212, the server may retrieve the requested data from the data repository and return the response (e.g., comprising the requested data) immediately to the second electronic user device via the user side virtual machine. Because the requested data (e.g., second status data) is identical to or can be derived from the first status data that are stored within the data repository, the server may retrieve the first status data from the data repository and transmit the retrieved first status data to the second electronic device via the user side virtual machine.

The embodiments disclosed herein may work with common networking standards and may work as a proxy server for network information. The server may forward traffic between the user device and the at-risk network unless similar traffic has been recently observed. If there is a similar requested, the server may return a cached version of the requested data from the data repository instead of forwarding the request to the at-risk network.

As discussed above, the user side area of the server may comprise the user side virtual machine and the data repository. After the server receives the second request through the user side virtual machine, the server may access the data repository to retrieve the requested data. The data repository may comprise a database where all data about the network will be consolidated. A potential base for this service may be a combination of ElasticSearch, Logstash, and Kibana, abbreviated as the ELK Stack. ElasticSearch provides a search engine on top of diverse data. Logstash takes multiple formats and types of data, such as logging data, and modifies it for consistent storage in the search engine. Kibana gives the user a fast way to look at the data. A stack such as the ELK Stack demonstrates the power of combining many data sources into one place.

The embodiments disclosed herein may feature a newly-developed central repository specifically tailored to deployed networks and the needs of cyber protection users. For example, the central repository may be tailored based on storage requirements for a network with the ideal number of network connections.

At step 214, the server may collected the requested data (e.g., second status data) from the at-risk network via the collection virtual machine, transmit the second status data to the second electronic device via the user side virtual machine, and store the requested data (e.g., second status data) into the data repository.

If the requested data is not cached within the data repository, the server may determine that the data repository needs update. The server may utilize the inter-domain communication channel to forward the request to the at-risk network through the collection virtual machine. The server may collect the requested data from the at-risk network as discussed above. Specifically, the collection virtual machine may comprise required applications to access the state and traffic of the at-risk network. The collected data may comprise state, protocol traffic, as well as other information about the machines, routers, and any other devices included in the at-risk network.

The server may store the newly collected data into the data repository. By storing the collected data corresponding to different requests into the data repository, the server may build a database storing various status information regarding the at-risk network. Different users may request duplicate information from the at-risk network. For example, in a given type of cyber protection mission, the different users may issue commands requesting the heaviest traffic flows and the most used applications frequently. The server may recognize the duplicate requests and retrieve the requested information from the data repository and return the responses immediately for such requests. Because the server does not query the same essential information from the at-risk network for multiple times, the embodiments disclosed herein may free up bandwidth and resources on the at-risk network, while providing the required information to the different cyber protection users.

The open threat hunter system disclosed herein may rely on the collaboration of multiple virtual machines to securely move data out of the at-risk network and into the cyber protection user enclave. The efficient data repository may efficiently use the resources/data supplied to it. Virtualization not only efficiently uses computing resources, but also helps reduce the strain the various user devices could place on the at-risk network. The server may be configured to manage two separate virtual machines with a partition between them to ensure that the server monitors/brokers all communication between the user side and the at-risk network side. The server may be able to accurately restrict the amount of traffic users could create in the at-risk network, ensuring a minimum footprint on the low bandwidth at-risk network.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a server from a first electronic user device, a first request requesting a first status data of an at-risk network via a first virtual machine of the server;
collecting, by the server, the first status data from the at-risk network via a second virtual machine of the server that is isolated from the first virtual machine of the server;
transmitting, by the server, the collected first status data to the first electronic user device via the first virtual machine of the server;
caching, by the server, the collected first status data into a data repository of the server;
receiving, by the server from a second electronic user device, a second request requesting a second status data of the at-risk network via the first virtual machine of the server;
upon the second status data corresponding to the first status data, retrieving, by the server, the first status data from the data repository instead of the at-risk network; and
transmitting, by the server, the retrieved first status data to the second electronic user device via the first virtual machine of the server.

2. The computer-implemented method of claim 1, further comprising:
upon the second status data not corresponding to the first status data,
collecting, by the server, the second status data from the at-risk network via the second virtual machine;
transmitting, by the server, the collected second status data to the second electronic user device via the first virtual machine of the server; and
storing, by the server, the collected second status data into the data repository of the server.

3. The computer-implemented method of claim 1, wherein communication between the first virtual machine and the second virtual machine is through an inter-domain communication channel.

4. The computer-implemented method of claim 1, wherein the first virtual machine is a user side virtual machine that interfaces electronic user devices over a high-capacity network.

5. The computer-implemented method of claim 1, wherein the second virtual machine is a collection virtual machine that interfaces the at-risk network.

6. The computer-implemented method of claim 1, wherein the server communicates with the first and second electronic user devices over a high capacity network that has a larger bandwidth than the at-risk network.

7. The computer-implemented method of claim 1, wherein the server is partitioned into two isolated areas, a first area comprising the first virtual machine and the data repository, a second area comprising the second virtual machine.

8. The computer-implemented method of claim 1, further comprising:
updating, by the server, status data in the data repository based on a last-update timestamp and a type of the status data.

9. The computer-implemented method of claim 1, wherein the second status data is identical to the first status data.

10. The computer-implemented method of claim 1, wherein the second status data is derived from the first status data.

11. A computer system comprising:
a first electronic user device,
a second electronic user device,
a server in communication with the first and second electronic user devices and configured to:
receive, from the first electronic user device, a first request requesting a first status data of an at-risk network via a first virtual machine of the server;
collect the first status data from the at-risk network via a second virtual machine of the server that is isolated from the first virtual machine of the server;
transmit the collected first status data to the first electronic user device via the first virtual machine of the server;
cache the collected first status data into a data repository of the server;
receive, from the second electronic user device, a second request requesting a second status data of the at-risk network via the first virtual machine of the server;
upon the second status data corresponding to the first status data, retrieve the first status data from the data repository instead of the at-risk network; and
transmit the retrieved first status data to the second electronic user device via the first virtual machine of the server.

12. The computer system of claim 11, wherein the server is further configured to:
upon the second status data not corresponding to the first status data,
collect the second status data from the at-risk network via the second virtual machine;
transmit the collected second status data to the second electronic user device via the first virtual machine of the server; and
store the collected second status data into the data repository of the server.

13. The computer system of claim 11, wherein communication between the first virtual machine and the second virtual machine is through an inter-domain communication channel.

14. The computer system of claim 11, wherein the first virtual machine is a user side virtual machine that interfaces electronic user devices over a high-capacity network.

15. The computer system of claim 11, wherein the second virtual machine is a collection virtual machine that interfaces the at-risk network.

16. The computer system of claim 11, wherein the server communicates with the first and second electronic user devices over a high capacity network that has a larger bandwidth than the at-risk network.

17. The computer system of claim 11, wherein the server is partitioned into two isolated areas, a first area comprising the first virtual machine and the data repository, a second area comprising the second virtual machine.

18. The computer system of claim 11, wherein the server is further configured to:
update status data in the data repository based on a last-update timestamp and a type of the status data.

19. The computer system of claim 11, wherein the second status data is identical to the first status data.

20. The computer system of claim 11, wherein the second status data is derived from the first status data.

* * * * *